United States Patent Office 2,882,269
Patented Apr. 14, 1959

2,882,269

AZO DYES

Ulrich Hoffmann, Bad Homburg, Germany, and Heinrich Hopff and Hans Heinrich Kuhn, Zurich, Switzerland, assignors to Pittsburgh Coke & Chemical Company, Pittsburgh, Pa., a corporation of Pennsylvania No Drawing. Application January 4, 1955
Serial No. 479,856

14 Claims. (Cl. 260—180)

The present invention relates to novel azo dyes and process for making same.

The primary object of the present invention is to provide a group of azo dyestuffs which exhibit good affinity for synthetic fibers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the invention, it has been found that dyestuffs suitable for use with synthetic fibers, e.g., acetate rayon, nylon (i.e., linear polyamides, such as polymeric hexamethylene adipamide), perlon (polymers, such as polymeric epsilon caprolactam and polyurethanes), PC fibre (a polyvinylchloride fiber), Terylene (polymeric glycol terephthalate) and similar fibers, can be made by condensing the reaction product of certain aromatic amines and styrene oxide or a homologue thereof with various diazonium compounds. The dyes obtained are from sparingly soluble to completely insoluble in water. In dispersed form, e.g., in an aqueous soap bath, they exhibit good affinity to fibers of the type referred to supra with the color of the final dyestuff depending upon the particular aromatic amine and diazonium salt employed.

The reaction between the aromatic amine and the styrene oxide can be carried out by heating equivalent quantities of the reactants at 50° C. to 200° C., e.g., at the reflux temperature. Preferably, this is accomplished in the presence of an inert solvent, e.g., xylene, toluene and benzene. Frequently, it is desirable to add a small amount of an acid catalyst, e.g., sulfuric acid, glacial acetic acid, phosphoric acid, zinc chloride, aluminium chloride or a basic catalyst, such as an organic amine, more especially, an aliphatic amine. Suitable amines are ethyl amine, dibutylamine, triethylamine and their salts. Preferably, the amine is an alkyl amine. As between the use of acidic and basic catalysts, the acidic catalysts are preferred.

As examples of aromatic amines, we can use aniline, meta-toluidine, methyl aniline, ethyl aniline.

The aromatic amine, preferably, should not contain reactive substituents other than the amino group, as the presence of such substituents leads to side reactions with the styrene oxide. Either primary or secondary aryl monoamines can be employed. In place of styrene oxide, its homologues, e.g., p-methyl styrene oxide, can be employed.

The reaction is believed to proceed according to the following general scheme

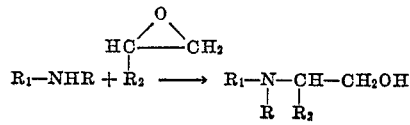

or

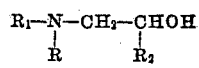

wherein each of $R_1$ and $R_2$ are aryl radicals and R is hydrogen, an alkyl or aryl radical. When meta-toluidine is reacted with styrene oxide, the equation becomes:

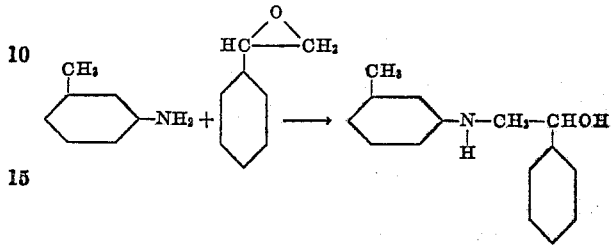

while with N-methyl aniline, the equation is:

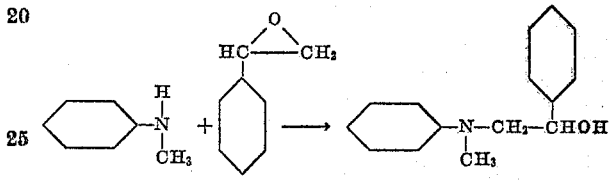

Thus, it can be seen that the products are monoethanolamines, having two aromatic or aryl groups, one attached to the nitrogen atom and the other to one of the two carbon atoms.

The reaction product of the aromatic amine and styrene oxide is next condensed with the appropriate diazonium salts. Examples of such salts are diazotized p-ntiro aniline, diazotized aniline, 4-chlor-3-nitro-aniline, tetrazotized benzidine, diazotized naphthylamine, diazotized p-amino-azo-benzene. The diazotized amines are well known articles of commerce and can be prepared, for example, by diazotizing the corresponding amine, e.g. p-nitro aniline, with sodium nitrite in the presence of an acid, such as hydrochloric acid.

Example I 58 parts p-toluidine
80 parts styrene oxide
1 part glacial acetic acid
250 parts xylene The above materials are refluxed for 5 hours. The xylene is then distilled off under vacuum of 10 mm. There remains a light yellow viscous oil which is distillable under high vacuum.

Example II 58 parts methyl aniline
80 parts styrene oxide
1 part glacial acetic acid
250 parts xylene The above materials are treated as in Example I. The reaction product is again a viscous oil.

Example III 231 parts of the viscous oil of Example I is reacted with 175 parts of diazotized p-nitro aniline at 0 to 2° C. in the following manner:

The viscous oil is dissolved in 4500 parts of water and 3 mols of hydrochloric acid; the solution is cooled to 0 to 3° C. and under stirring a solution of 3 mols of sodium acetate is added. Then the diazotized amine in solution is added dropwise under stirring for half an hour. The dye separates as a flocculant precipitate which is filtered and washed with water. It can be used as a 10 to 30% paste.

The product obtained is a red dye suitable for dyeing the synthetic fibers of the type referred to above.

*Example IV*

The process of Example III was repeated, using parts of the viscous oil of Example I and 130 parts of diazotized aniline to give a yellow dye.

*Example V*

The process of Example III was repeated, using parts of the viscous oil of Example I and 139 parts of tetrazotized benzidine to produce a deep red dye.

*Example VI*

The process of Example III was repeated, using parts of the viscous oil of Example I and 190 parts of diazotized naphthyl amine. The resulting product was a violet dye.

*Example VII*

The process of Example III was similarly repeated, using the viscous oil of Example II. When diazotized nitroaniline was employed, the product was a red dye. With diazotized aniline, in place of the diazotized nitroaniline, as in Example IV, the product was a light red dye. The use of tetrazotized benzidine with the viscous oil of Example II, under the conditions of Example III, gave a violet dye.

As will be apparent from the above examples, the reaction products of styrene oxide with aromatic monoamines can be employed to couple with any of the conventional diazonium salts.

The conditions recited in Examples III to VII can be varied in the following manner.

The temperature can range from 0° C. to 10° C.

As diluents or solvents, there can be present pyridine, acetone, acetic acid. The diluent or solvent can be used in an amount of from 100 parts to 500 parts, based on 100 parts of the styrene oxide-aromatic amine condensation product.

We claim:

1. The azo dye coupling product of a member of the group consisting of diazonium salts of the benzene, naphthalene and benzidine series with an ethanolamine having a formula selected from the group consisting of

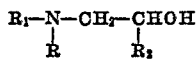

and

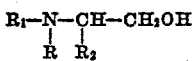

wherein $R_1$ and $R_2$ are aryl radicals of the benzene series and R is selected from the group consisting of hydrogen and a lower alkyl radical.

2. The azo dye coupling product of claim 1, wherein the diazonium salt is diazotized p-nitro aniline.

3. The azo dye coupling product of claim 1, wherein the diazonium salt is diazotized aniline.

4. The azo dye coupling product of claim 1, wherein the diazonium salt is tetrazotized benzidine.

5. The azo dye coupling product of claim 1, wherein the diazonium salt is diazotized naphthyl amine.

6. The azo dye coupling product of a member of the group consisting of diazonium salts of the benzene, naphthalene and benzidine series with an ethanolamine having the formula

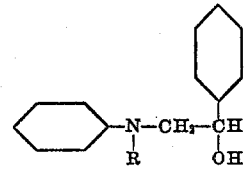

wherein R is selected from the group consisting of hydrogen and a lower alkyl radical.

7. The azo dye coupling product of a member of the group consisting of diazonium salts of the benzene, naphthalene and benzidine series with an ethanolamine having the formula

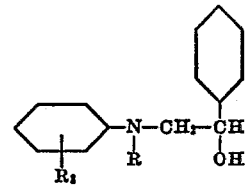

wherein R is selected from the group consisting of hydrogen and a lower alkyl group and $R_3$ is a lower alkyl group.

8. An azo dye coupling product according to claim 6 wherein R is hydrogen.

9. An azo dye coupling product according to claim 8 wherein the diazonium salt is diazotized p-nitro aniline.

10. An azo dye coupling product according to claim 6 wherein R is a lower alkyl group.

11. An azo dye coupling product according to claim 10 wherein the alkyl group has 1 to 2 carbon atoms.

12. An azo dye coupling product according to claim 11 wherein the diazonium salt is diazotized p-nitro aniline.

13. An azo dye coupling product according to claim 7 wherein $R_3$ is methyl and R is hydrogen.

14. An azo dye coupling product according to claim 13 wherein the diazonium salt is diazotized p-nitro aniline.

References Cited in the file of this patent

UNITED STATES PATENTS

| | | |
|---|---|---|
| 2,078,387 | Kern | Apr. 27, 1937 |
| 2,173,052 | Hitch et al. | Sept. 12, 1939 |
| 2,257,091 | Erickson | Sept. 30, 1941 |
| 2,271,220 | Dickey et al. | Jan. 27, 1942 |
| 2,768,160 | Dickey et al. | Oct. 23, 1956 |